April 11, 1933. W. W. KELLY 1,903,547
TOASTING AND STORAGE CABINET
Filed June 5, 1931 3 Sheets-Sheet 2
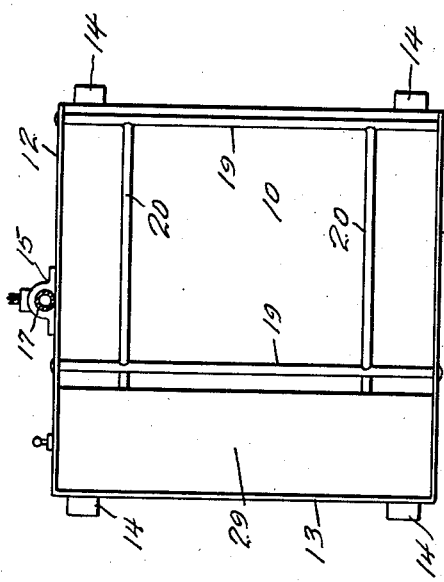
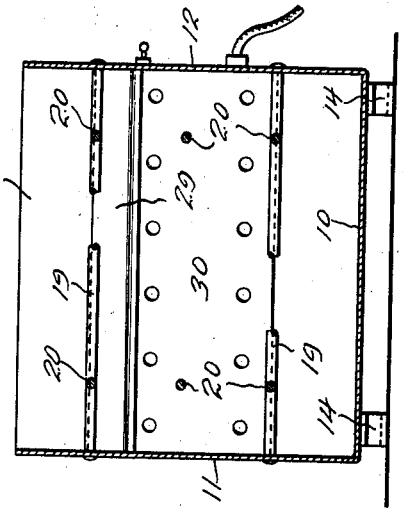
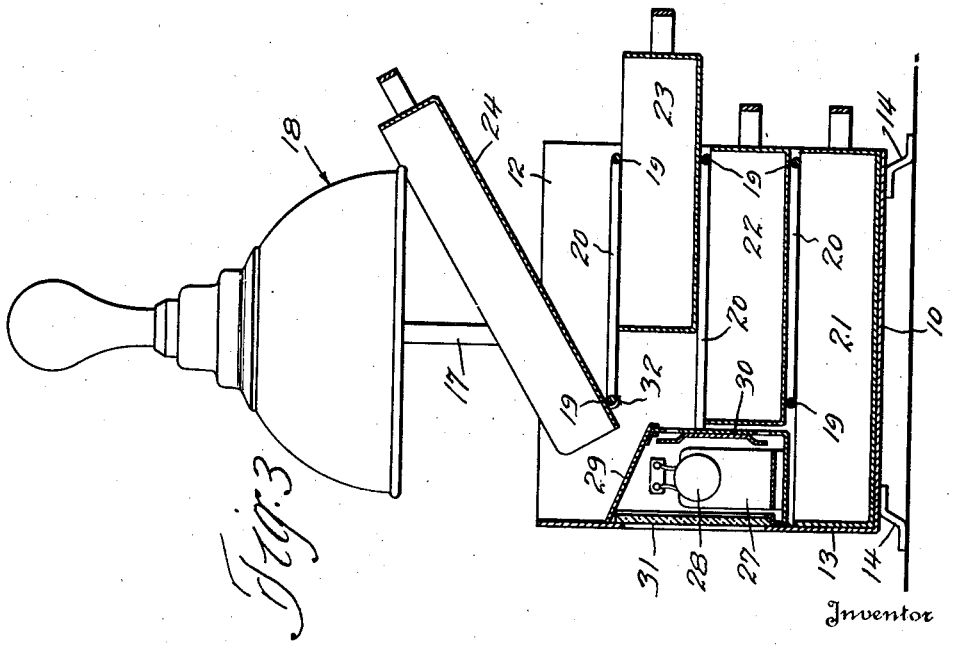
Inventor
William W. Kelly
By Hull Brock & West
Attorney April 11, 1933.  W. W. KELLY  1,903,547
TOASTING AND STORAGE CABINET
Filed June 5, 1931  3 Sheets-Sheet 3
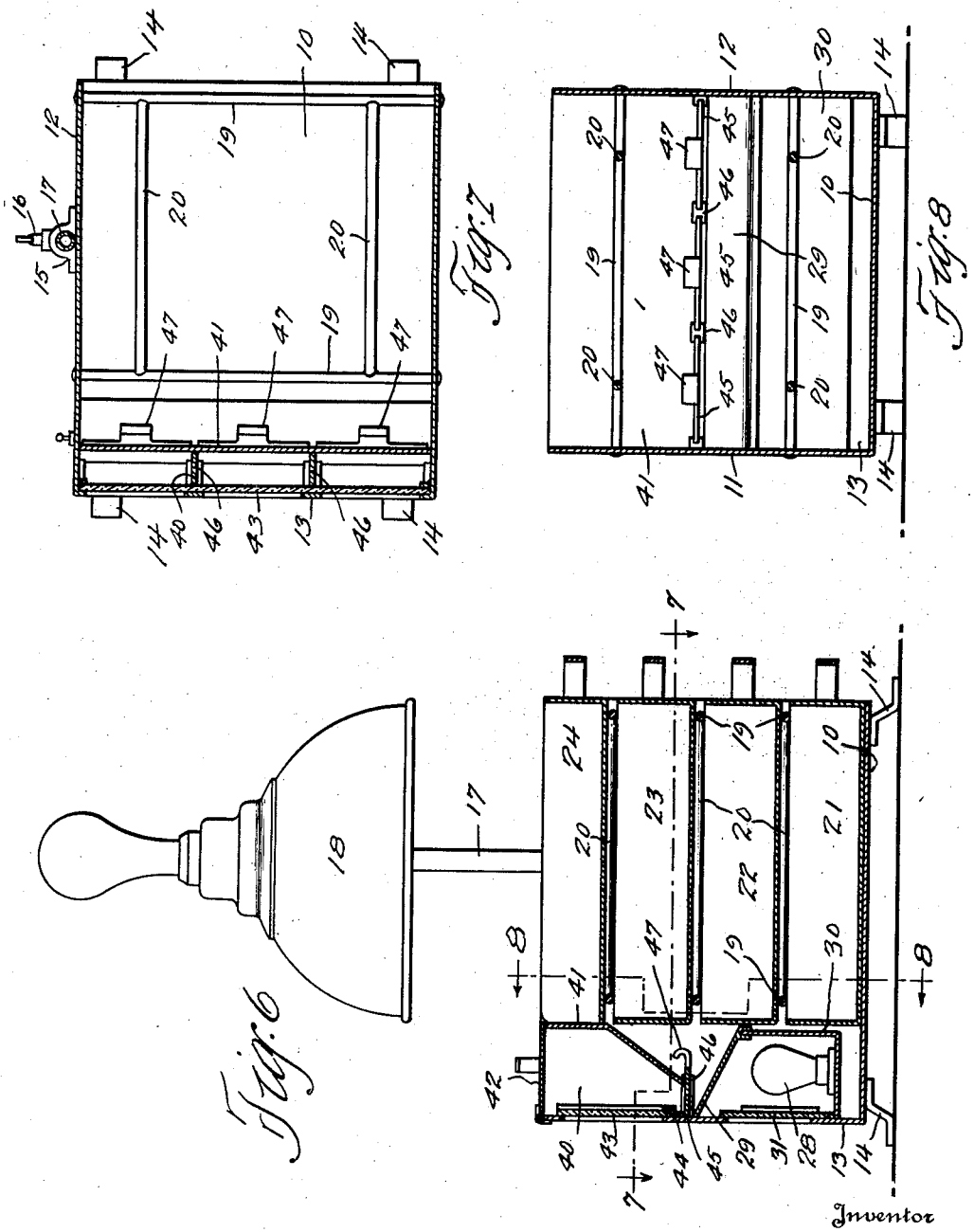

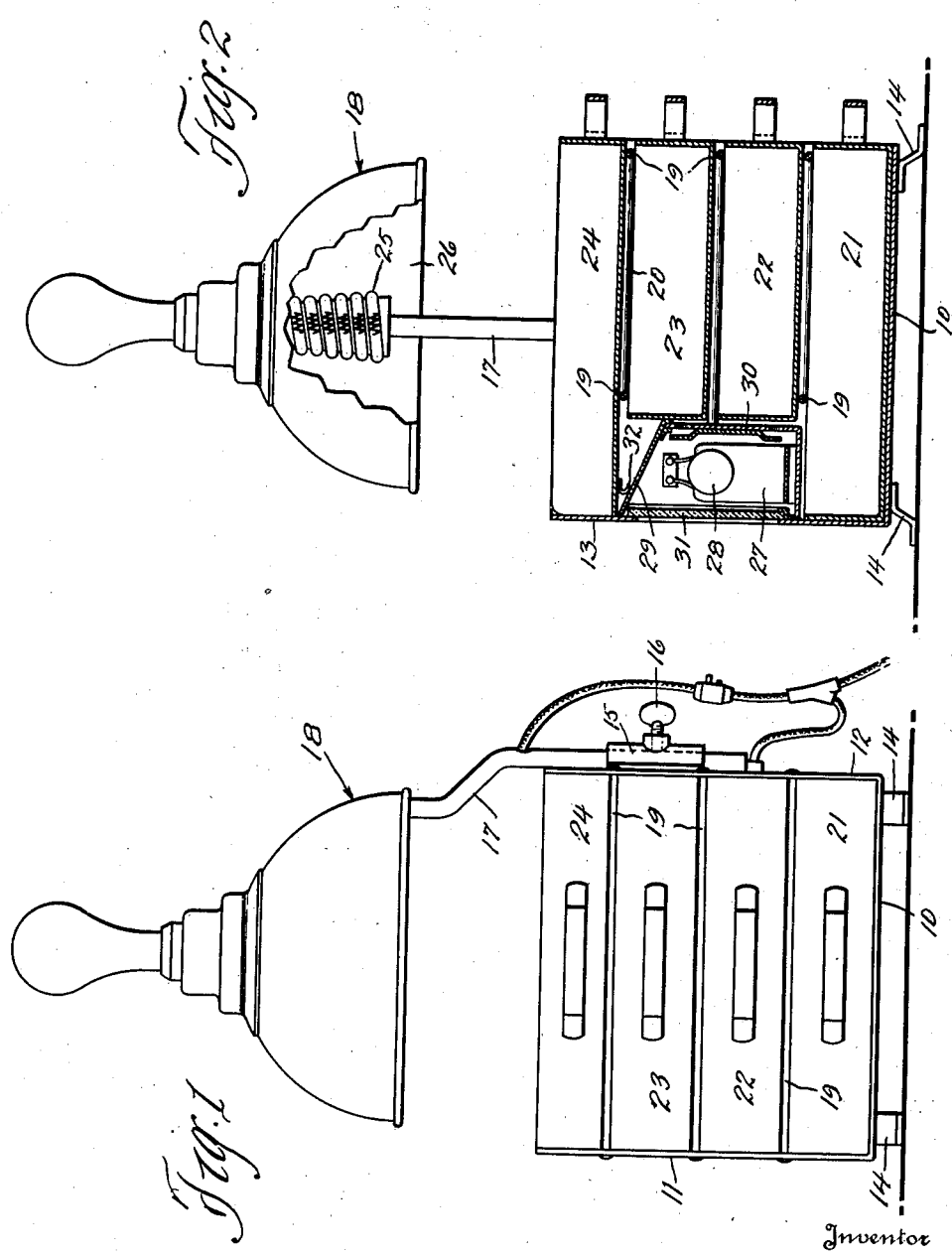

Patented Apr. 11, 1933

1,903,547

UNITED STATES PATENT OFFICE

WILLIAM W. KELLY, OF CLEVELAND HEIGHTS, OHIO, ASSIGNOR TO THE NUT PRODUCTS COMPANY

TOASTING AND STORAGE CABINET

Application filed June 5, 1931. Serial No. 542,359.

This invention relates to a toasting and storage cabinet particularly adapted for toasting and storing nuts or the like.

The principal object of this invention is to provide a simple, convenient and comparatively inexpensive toasting and storage device which is well adapted to the toasting of nuts and the like and the storage under proper temperature conditions of one or more kinds of nuts.

A further object is the provision of a convenient manner for toasting, storing and conditioning a plurality of varieties of nuts in the same device.

Other and more limited objects will become apparent from the following description when taken in connection with the accompanying drawings, in which Fig. 1 is an elevational view; Fig. 2 is a part sectional view taken at substantially right angles to the showing of Fig. 1; Fig. 3 is a part sectional view corresponding substantially to the view of Fig. 2 and showing the roasting pan and one of the storage drawers in position for transferring the charge of nuts from the roasting pan to one of the lower drawers; Fig. 4 is a plan view with the roasting pan and storage drawers removed and showing the stand which supports the heating unit in section; Fig. 5 is a vertical sectional view looking at right angles to the view of Fig. 3; Fig. 6 is a partial vertical section through a modified form; Fig. 7 is a section on the line 7—7 of Fig. 6 and Fig. 8 is a section on the line 8—8 of Fig. 6.

In the embodiment disclosed in Figs. 1 to 5, I have shown a cabinet having a bottom wall 10 and upright walls 11, 12 and 13. Secured to the bottom wall 10 are supporting legs 14. Secured to the wall 12 is a bracket 15 provided with a set screw 16 and adapted to receive a bar 17 which supports a heating unit indicated generally by the numeral 18 for vertical adjustment. Extending across the cabinet and secured to the walls 11 and 12 in any suitable manner are rods 19 to which are secured by welding, soldering or in any other desirable manner cross rods 20. The rods 19 and 20 form supports for the storage drawers 21, 22, 23 and the roasting pan 24. The cabinet has no top, the roasting pan 24 resting on the uppermost set of bars 19 and 20 and opening upwardly. The heating unit 18 will include a resistance element 25 of conventional construction and a reflector 26 adapted to direct the heat rays from the unit 25 downwardly upon the roasting pan 24. The reflector 26 will preferably be generally parabolic in form whereby to direct the heat rays downwardly and more or less vertically. Adjacent one wall of the cabinet is provided a compartment 27 which contains a lamp 28 and it is defined by an angularly downwardly extending baffle 29 at the top and a rear wall 30 of any suitable construction. A transparent or translucent plate 31 provided with any suitable advertising material defines the exterior boundary of the compartment 27. The roasting pan may be provided with a downwardly extending lug 32 to position it at a proper point for discharge of nuts into the storage drawers, although this is not essential.

As is obvious from Fig. 3, a charge of nuts after being roasted may be dumped into any one of the three storage drawers illustrated by withdrawing the same part way and elevating it to dumping position. When nuts are being dumped into the two lowermost drawers, they may be allowed to slide onto the baffle 29 from which they will flow into the storage drawer.

In Figs. 6 and 7, I have indicated a device embodying the features of the first modification and also including a sample display compartment for each of the three kinds of nuts contained in the storage drawers. In this modification, analogous structures are indicated by the same numerals employed in the first modification. The function of these structures will be obvious and need not be further described.

In this case the advertising means described in connection with the first modification is lowered to a position adjacent the bottom wall 10 and includes the upper baffle 29, the transparent or translucent wall 31 and the lamp 28. The sample display compartment 40 is defined by a rear wall 41, a hinged top wall 42, a transparent panel 43 supported in suitable guides 44 and a sliding bottom wall 45 slidably supported in guides 46 and provided with a handle 47 for convenient withdrawal to allow convenient changing of the sample to prevent them from becoming stale.

When it is desired to replace the sample in the compartment 40, the drawer containing nuts of the same kind will be placed in the bottom while the upper two will be partially withdrawn. The slide 45 will then be withdrawn, allowing the nuts to escape onto the baffle 29 and into the bottom drawer. As is obvious from the drawings, three sample compartments with separate sliding bottoms are provided for display of each of the three kinds of nuts contained in the storage drawers. When the sample compartments are to be filled, the hinged closure 42 is opened and the samples are placed therein in any suitable way. The advertising device and the heating unit are energized by a suitable source of current and controlled by suitable switches, as will be obvious from the drawings.

While I have shown and described certain illustrative embodiments of my invention, I wish it understood that I am not limited to the details of such embodiments except in accordance with the scope of the appended claims.

Having thus described my invention, what I claim is:

1. In a device of the class described, a cabinet having an open top, means for supporting a roasting pan within said cabinet adjacent said open top, means for supporting a drawer below said first means, a drawer supported thereon, said first means comprising openwork whereby material may be dumped from said roasting pan into said drawer and a heating means positioned above said cabinet and said roasting pan for directing heat upon the material in said pan.

2. In a device of the class described, a cabinet having an open top and an open front, means for supporting a receptacle adjacent said top, means for supporting a second receptacle beneath said first receptacle, said first means comprising openwork whereby material may be dumped from said first receptacle into said second receptacle, and a heating means positioned above said cabinet for directing heat upon the material in the uppermost said receptacle.

3. In a device of the class described, a cabinet having an open top and an open front, bars extending across said cabinet laterally for supporting a plurality of receptacles one above another, a plurality of receptacles supported on said bars and a heating means positioned above the top of said cabinet for directing heat upon the material in the uppermost of said receptacles.

4. In a device of the class described, a cabinet having an open top and an open front, bars extending across said cabinet laterally for supporting a plurality of receptacles one above another, a plurality of receptacles supported on said bars and a heating means positioned above the top of said cabinet for directing heat upon the material in the uppermost of said receptacles, one of said receptacles having an open end to facilitate dumping material therefrom into a lower receptacle without removal from the cabinet.

5. In a device of the character described, a cabinet having an open top and an open front, a plurality of openwork receptacle supporting means extending horizontally in said cabinet, a roasting pan supported on the uppermost of said means, said pan provided with an open front, a heating means positioned above the top of said cabinet for directing heat rays upon material in said pan, a plurality of drawers supported one above another beneath said roasting pan, either being adapted to receive material dumped from said roasting pan, the upper when in full "in" position, a lower one when in "in" position and the upper one at least partially withdrawn.

In testimony whereof, I hereunto affix my signature.

WILLIAM W. KELLY.